(12) United States Patent
Kerofsky et al.

(10) Patent No.: US 12,294,714 B2
(45) Date of Patent: *May 6, 2025

(54) VIDEO DECODER WITH REDUCED DYNAMIC RANGE TRANSFORM WITH INVERSE TRANSFORM SHIFTING MEMORY

(71) Applicant: DOLBY INTERNATIONAL AB, Dublin (IE)

(72) Inventors: Louis J. Kerofsky, Camas, WA (US); Kiran Misra, Vancouver, WA (US); Christopher A. Segall, Camas, WA (US)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,856

(22) Filed: Apr. 29, 2024

(65) Prior Publication Data

US 2024/0406399 A1     Dec. 5, 2024

Related U.S. Application Data

(63) Continuation of application No. 17/874,773, filed on Jul. 27, 2022, now Pat. No. 12,003,730, which is a continuation of application No. 17/208,560, filed on Mar. 22, 2021, now Pat. No. 11,431,982, which is a continuation of application No. 16/863,479, filed on
(Continued)

(51) Int. Cl.
*H04N 19/132* (2014.01)
*H04N 19/176* (2014.01)
*H04N 19/182* (2014.01)
*H04N 19/184* (2014.01)
*H04N 19/44* (2014.01)

(52) U.S. Cl.
CPC ......... *H04N 19/132* (2014.11); *H04N 19/176* (2014.11); *H04N 19/182* (2014.11); *H04N 19/184* (2014.11); *H04N 19/44* (2014.11)

(58) Field of Classification Search
None
See application file for complete search history.

(56) References Cited

U.S. PATENT DOCUMENTS

| 5,706,002 A | 1/1998 | Meehan et al. |
| 5,712,686 A | 1/1998 | Cho |

(Continued)

FOREIGN PATENT DOCUMENTS

| JP | 03-256455 A | 11/1991 |
| JP | 6-125539 A | 5/1994 |

(Continued)

OTHER PUBLICATIONS

"Part 10: Advanced Video Coding." ISO publication: ISO/IEC 14496-10:2005—Information technology—Coding of audio-visual objects, Mar. 2010, 14 pages, Part12.
(Continued)

*Primary Examiner* — Peter D Le
(74) *Attorney, Agent, or Firm* — Fish & Richardson P.C.

(57) ABSTRACT

A method for decoding video includes receiving quantized coefficients representative of a block of video representative of a plurality of pixels. The quantized coefficients are dequantized based upon a function of a remainder. The dequantized coefficients are inverse transformed to determine a decoded residue.

12 Claims, 7 Drawing Sheets

Related U.S. Application Data

Apr. 30, 2020, now Pat. No. 10,958,910, which is a continuation of application No. 16/404,060, filed on May 6, 2019, now Pat. No. 10,652,545, which is a continuation of application No. 15/910,995, filed on Mar. 2, 2018, now Pat. No. 10,284,855, which is a continuation of application No. 14/882,631, filed on Oct. 14, 2015, now Pat. No. 9,955,165, which is a continuation of application No. 13/008,658, filed on Jan. 18, 2011, now Pat. No. 9,807,395.

(56) References Cited

U.S. PATENT DOCUMENTS

| | | |
|---|---|---|
| 5,854,799 A | 12/1998 | Okada et al. |
| 6,044,176 A | 3/2000 | Kim et al. |
| 6,501,797 B1 | 12/2002 | van der Schaar et al. |
| 7,020,671 B1 | 3/2006 | Saha |
| 7,106,797 B2 | 9/2006 | Malvar |
| 7,382,925 B2 | 6/2008 | Boliek et al. |
| 7,778,813 B2 | 8/2010 | Zhou |
| RE43,091 E | 1/2012 | Kerofsky et al. |
| 9,807,395 B2 | 10/2017 | Kerofsky et al. |
| 9,955,165 B2 | 4/2018 | Kerofsky et al. |
| 10,284,855 B2 | 5/2019 | Kerofsky et al. |
| 10,652,545 B2 | 5/2020 | Kerofsky et al. |
| 10,958,910 B2 | 3/2021 | Kerofsky et al. |
| 11,431,982 B2 | 8/2022 | Kerofsky et al. |
| 12,003,730 B2 | 6/2024 | Kerofsky et al. |
| 2003/0081674 A1 | 5/2003 | Melvar |
| 2004/0151253 A1 | 8/2004 | Bossen |
| 2004/0258151 A1 | 12/2004 | Spampinato |
| 2005/0036545 A1 | 2/2005 | Zhou |
| 2005/0047509 A1 | 3/2005 | Lee et al. |
| 2006/0294172 A1 | 12/2006 | Zhong |
| 2007/0058720 A1 | 3/2007 | Park et al. |
| 2007/0206679 A1 | 9/2007 | Lim et al. |
| 2007/0233764 A1 | 10/2007 | Reznik et al. |
| 2007/0248274 A1 | 10/2007 | Govindaswamy et al. |
| 2007/0274600 A1 | 11/2007 | Suzuki |
| 2007/0299897 A1 | 12/2007 | Reznik |
| 2009/0172506 A1 | 7/2009 | Yoneoka et al. |
| 2010/0014582 A1 | 1/2010 | Yoshimatsu |
| 2012/0183046 A1 | 7/2012 | Kerofsky et al. |
| 2012/0219055 A1 | 8/2012 | He et al. |
| 2016/0037163 A1 | 2/2016 | Kerofsky et al. |
| 2018/0192056 A1 | 7/2018 | Kerofsky et al. |
| 2019/0260997 A1 | 8/2019 | Kerofsky et al. |
| 2020/0260088 A1 | 8/2020 | Kerofsky et al. |
| 2021/0211675 A1 | 7/2021 | Kerofsky et al. |
| 2023/0052841 A1 | 2/2023 | Kerofsky et al. |

FOREIGN PATENT DOCUMENTS

| | | |
|---|---|---|
| JP | 10-149350 A | 6/1998 |
| JP | 2000-050263 A | 2/2000 |
| JP | 2003-133961 A | 5/2003 |
| JP | 2004-328480 A | 11/2004 |
| JP | 2005-354307 A | 12/2005 |
| JP | 2006-060314 A | 3/2006 |
| JP | 2007-079972 A | 3/2007 |
| JP | 2009-159287 A | 7/2009 |
| WO | WO 2008/120433 A1 | 10/2008 |

OTHER PUBLICATIONS

"Part 10: Advanced Video Coding." ISO publication: ISO/IEC 14496-10:2005—Information technology—Coding of audio-visual objects, Mar. 2010, 60 pages, Part1.

"Part 10: Advanced Video Coding." ISO publication: ISO/IEC 14496-10:2005—Information technology—Coding of audio-visual objects, Mar. 2010, 60 pages, Part10.

"Part 10: Advanced Video Coding." ISO publication: ISO/IEC 14496-10:2005—Information technology—Coding of audio-visual objects, Mar. 2010, 60 pages, Part11.

"Part 10: Advanced Video Coding." ISO publication: ISO/IEC 14496-10:2005—Information technology—Coding of audio-visual objects, Mar. 2010, 60 pages, Part2.

"Part 10: Advanced Video Coding." ISO publication: ISO/IEC 14496-10:2005—Information technology—Coding of audio-visual objects, Mar. 2010, 60 pages, Part3.

"Part 10: Advanced Video Coding." ISO publication: ISO/IEC 14496-10:2005—Information technology—Coding of audio-visual objects, Mar. 2010, 60 pages, Part4.

"Part 10: Advanced Video Coding." ISO publication: ISO/IEC 14496-10:2005—Information technology—Coding of audio-visual objects, Mar. 2010, 60 pages, Part5.

"Part 10: Advanced Video Coding." ISO publication: ISO/IEC 14496-10:2005—Information technology—Coding of audio-visual objects, Mar. 2010, 60 pages, Part6.

"Part 10: Advanced Video Coding." ISO publication: ISO/IEC 14496-10:2005—Information technology—Coding of audio-visual objects, Mar. 2010, 60 pages, Part7.

"Part 10: Advanced Video Coding." ISO publication: ISO/IEC 14496-10:2005—Information technology—Coding of audio-visual objects, Mar. 2010, 60 pages, Part8.

"Part 10: Advanced Video Coding." ISO publication: ISO/IEC 14496-10:2005—Information technology—Coding of audio-visual objects, Mar. 2010, 60 pages, Part9.

International Telecommunication Union, "Series H: Audiovisual and Multimedia Systems, Infrastructure of audiovisual services—Coding of moving video, Advanced Video coding for generic audiovisual services, ITU/T H.264 (Mar. 2005)," Mar. 2005, pp. 171 to 173.

ISO/IEC, ISO/IEC 14496-2, Dec. 1, 2001, ISO/IEC, 2nd Edition, pp. 1-536.

JCT-VG "Draft Test Model under Consideration," JCTVC-A205, 1. JCT-VG Meeting, Dresden, Apr. 2010, 30 pages.

JCT-VG "TE 12: Evaluation of IBDI and TPE," JCTVC-C057, $3^{rd}$ Meeting, Guangzhou, CN, Oct. 2010, 8 pages.

Kerofsky et al., "Video Decoder With Reduced Dynamic Range Transform Including Clipping", U.S. Appl. No. 13/008,642, filed Jan. 18, 2011.

Kerofsky et al., "Video Decoder With Reduced Dynamic Range Transform With Inverse Transform Clipping", U.S. Appl. No. 13/008,676, filed Jan. 18, 2011.

Notification of Transmittal of International Preliminary Report on Patentability, PCT International Appln. No. PCT/JP2012/051480, mailed on Apr. 23, 2013, 11 pages.

Patent family list for Japanese Publication No. JPH10149350 (A), Published Jun. 2, 1998, Samsung Electron Co. Lid., 1 page.

PCT International Search Report in International Appln. No. PCT/JP2012/051480, mailed on May 1, 2012, 4 pages.

Richardson, "The H.264 Advanced Video Compression Standard," John Wiley & Sons, ltd, 2010, 2nd Edition, pp. 1-28.

VIDEO DECODER WITH REDUCED DYNAMIC RANGE TRANSFORM WITH INVERSE TRANSFORM SHIFTING MEMORY

CROSS-REFERENCE TO RELATED APPLICATIONS

This application is a continuation of U.S. application Ser. No. 17/874,773, filed Jul. 27, 2022, which is a continuation of U.S. application Ser. No. 17/208,560, filed Mar. 22, 2021, now U.S. Pat. No. 11,431,982, which is a continuation of U.S. application Ser. No. 16/863,479, filed Apr. 30, 2020, now U.S. Pat. No. 10,958,910, which is a continuation of U.S. application Ser. No. 16/404,060, filed May 6, 2019, now U.S. Pat. No. 10,652,545, which is a continuation of U.S. application Ser. No. 15/910,995, filed Mar. 2, 2018, now U.S. Pat. No. 10,284,855, which is a continuation of U.S. application Ser. No. 14/882,631, filed Oct. 14, 2015, now U.S. Pat. No. 9,955,165, which is a continuation of U.S. application Ser. No. 13/008,658, filed Jan. 18, 2011, now U.S. Pat. No. 9,807,395. The entire contents of each of the foregoing is herein incorporated by reference.

BACKGROUND OF THE INVENTION

The present invention relates to image decoding with reduced dynamic range.

Existing video coding standards, such as H.264/AVC, generally provide relatively high coding efficiency at the expense of increased computational complexity. As the computational complexity increases, the encoding and/or decoding speeds tend to decrease. Also, the desire for increased higher fidelity tends to increase over time which tends to require increasingly larger memory requirements and increasingly larger memory bandwidth requirements. The increasing memory requirements and the increasing memory bandwidth requirements tends to result in increasingly more expensive and computationally complex circuitry, especially in the case of embedded systems.

Referring to FIG. 1, many decoders (and encoders) receive (and encoders provide) encoded data for blocks of an image. Typically, the image is divided into blocks and each of the blocks is encoded in some manner, such as using a discrete cosine transform (DCT), and provided to the decoder. The decoder receives the encoded blocks and decodes each of the blocks in some manner, such as using an inverse discrete cosine transform. In many cases, the decoding of the image coefficients of the image block is accomplished by matrix multiplication. The matrix multiplication may be performed for a horizontal direction and the matrix multiplication may be performed for a vertical direction. By way of example, for 8-bit values, the first multiplication can result in 16-bit values, and the second multiplication can result in 24-bit values in some cases. In addition, the encoding of each block of the image is typically quantized, which maps the values of the encoding to a smaller set of quantized coefficients used for transmission. Quantization requires de-quantization by the decoder, which maps the set of quantized coefficients used for transmission to approximate encoding values. The number of desirable bits for de-quantized data is a design parameter. The potential for large values resulting from the matrix multiplication and the de-quantization operation is problematic for resource constrained systems, especially embedded systems.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
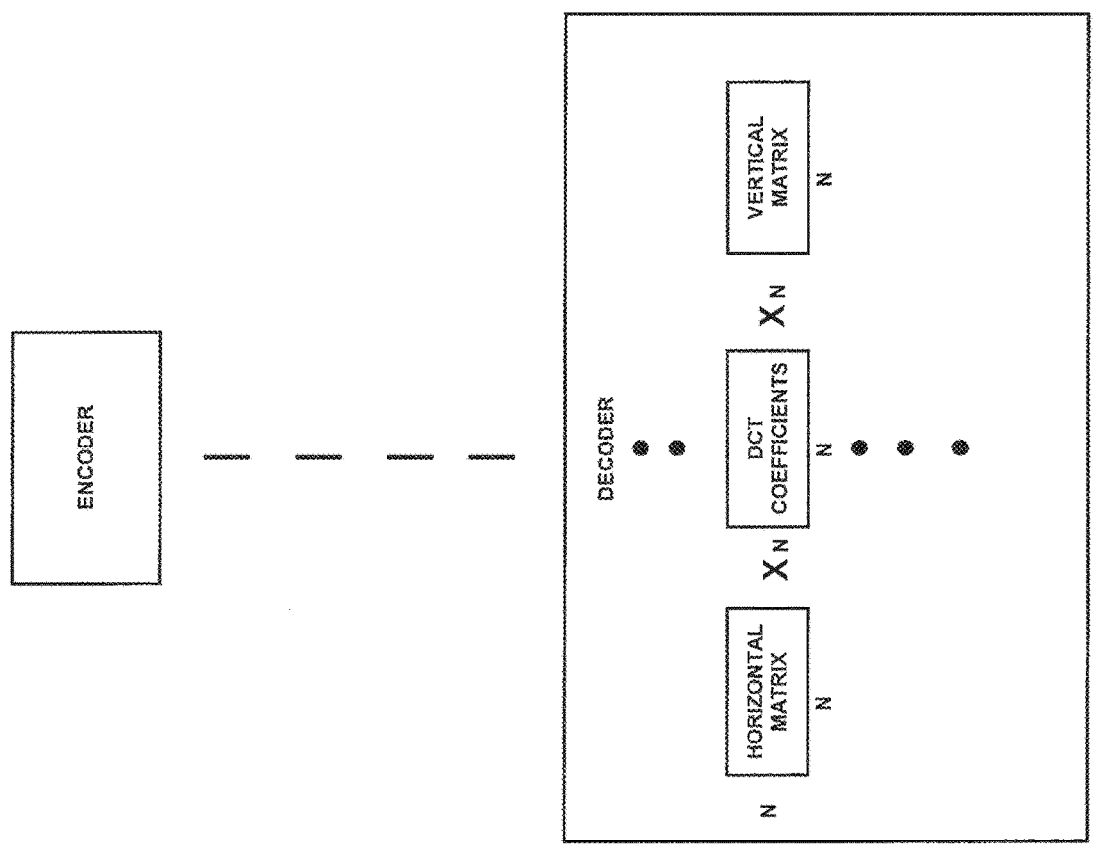
FIG. 1 illustrates an encoder and a decoder.
Figure 2:
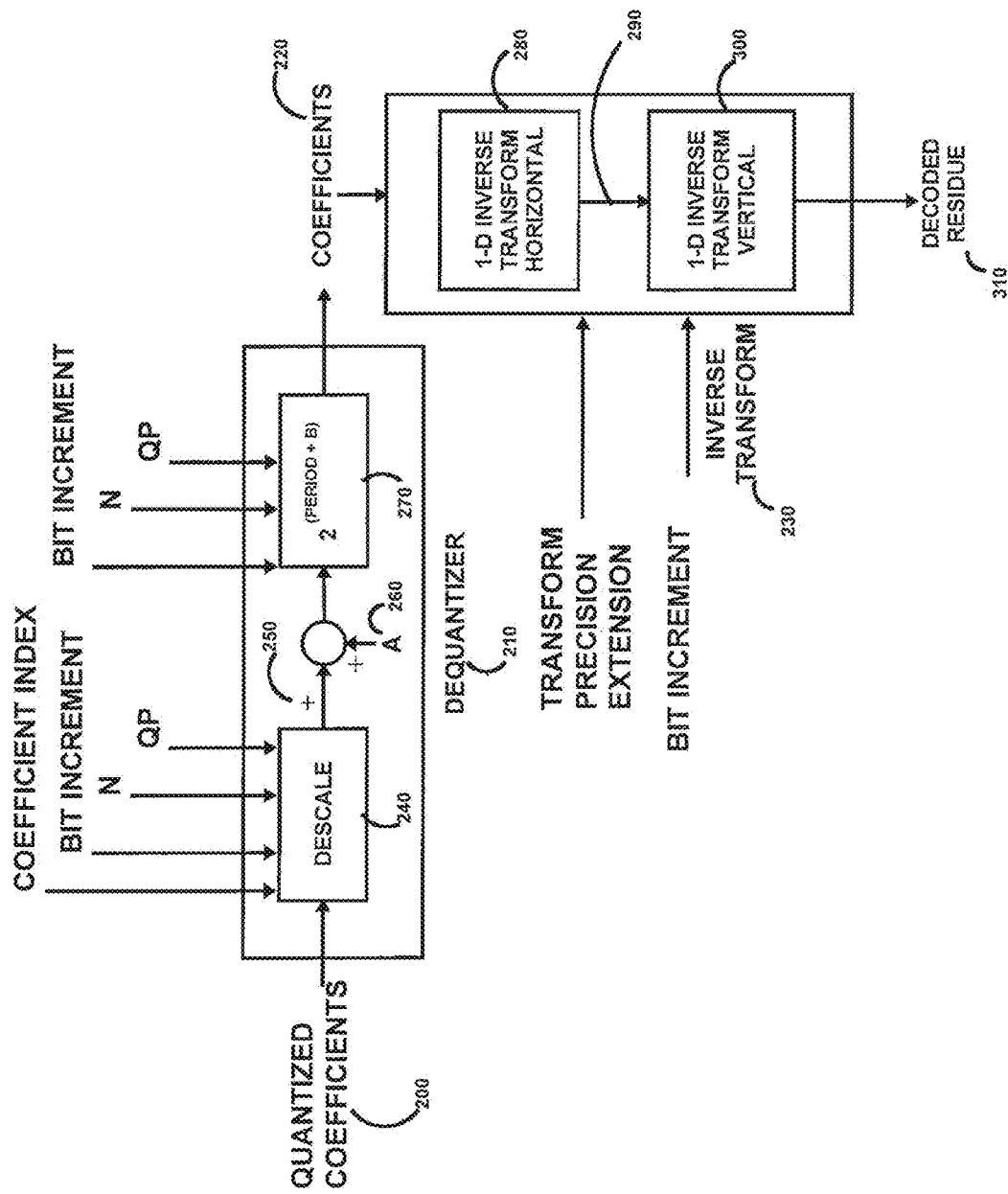
FIG. 2 illustrates a decoder with a dequantizer and an inverse transform.

Referring to FIG. 2 (prior art), a decoder for the dequantization and inverse transformation of the received quantized coefficients from the encoder for a block of the image is illustrated, in relevant part. The decoder receives the quantized coefficients 200 at a dequantizer 210. The coefficients resulting from the dequantizer 210 are stored in memory 220. The coefficients stored in memory 220 are then processed by a pair of inverse transforms 230 to determine a decoded residue 310. The inverse transform maps data from a transform domain to a spatial domain using a matrix multiplication operator.

The dequantizer 210 includes the descaling process 240. The descaling process 240 descales the quantized coefficients 200. The descaling process corresponds to multiplying level values (also referred to as quantized coefficients 200) with one integer number dependent on quantization parameter, coefficient index, and transform size. An example of the descaling process 240 may include Level*IntegerValue(Remainder,coefficient index)*16 for a dequantizer used prior to an 8×8 inverse transform and Level*IntegerValue (Remainder, coefficient index) for a dequantizer used prior to other transform sizes. The descaling process 240 is preferably based upon a function of a remainder, transform size, and/or a coefficient index (e.g., position), to determine an intermediate set of values 250. The remainder is the sum of the quantization parameter (QP)+P*BitIncrement modulo P ((QP+P*BitIncrement) %P). Modulo as defined in the H.264/AVC standard is defined as: x % y, as remainder of x divided by y, defined only for integers x and y with x>=0 and y>0. In one embodiment P may take on the value 6. An adjustment mechanism A 260 may be applied to the values 250, which may be a variable dependent on transform size and/or a function of a received Period. The period is the sum of the quantization parameter (QP)+P*BitIncrement divided by P ((QP+P*BitIncrement)/P), where "BitIncrement" is the bit depth increment. The "/" as defined in the H.264/AVC standard is defined as: integer division with truncation of the result towards zero. For example, 7/4 and −7/−4 are truncated to 1 and −7/4 and 7/−4 are truncated to −1. In one embodiment P may take on the value 6. The resulting values 250, possibly further modified by mechanism A 260, may be further modified by a factor of $2^{(Period+B)}$ 270. B is a variable that is dependent on the transform size. The results of the modification 270 are stored in the memory 220. The inverse transformation 230 may perform a 1-dimensional inverse horizontal transform 280, which is stored in memory 290. The inverse transform 230 may also perform a 1-dimensional inverse vertical transform 300, which results in the decoded residue 310. The transforms 280 and 300 may be swapped with each other, as desired.

The memory bandwidth of the video decoder illustrated in FIG. 2, when implemented within the "Part 10: Advanced Video Coding", ISO publication: ISO/IEC 14496-10: 2005—Information Technology—Coding Of Audio-Visual Objects (incorporated by reference herein) (H.264/AVC standard), may be limited by using a constraint. For example, in section 8.5.10 of the H.264/AVC standard, the width of the memory access for 4×4 luma DC transform coefficients is limited by including the following statements: "The bitstream shall not contain data that result in any element $f_{ij}$ of f with i, j=0 . . . 3 that exceeds the range of integer values from $-2^{(7+bitDepth)}$ to $2^{(7+bitDepth)}-1$, inclusive." and "The bitstream shall not contain data that result in any element $dcY_{ij}$ of dcY with i, j=0 . . . 3 that exceeds the range of integer values from $-2^{(7+bitDepth)}$ to $2^{(7+bitDepth)}-1$, inclusive." The H.264/AVC standard includes similar memory limitation for other residual blocks. In addition to including a complex memory bandwidth limitation, the H.264/AVC standard includes no mechanism to ensure that this limitation is enforced. Similarly, the JCT-VC, "Draft Test Model Under Consideration", JCTVC-A205, JCT-VC Meeting, Dresden, April 2010 (JCT-VC), incorporated by reference herein, likewise does not include a memory bandwidth enforcement mechanism. For robustness, a decoder must be prepared to accept bitstreams which may violate these limits as may be caused by transmission errors damaging a compliant bitstream or a non-conforming encoder. To alleviate such potential limitations the decoder frequently includes additional memory bandwidth, at added expense and complexity, to accommodate the non-compliant bit streams that are provided.

In order to provide a more computationally robust decoder with limited memory bandwidth and/or memory storage requirements, the decoder should be modified in a suitable manner However, while modifying the decoder to reduce the memory requirements, the corresponding rate distortion performance of the video should not be substantially degraded. Otherwise, while the memory requirements may be reduced, the resulting quality of the video will not be suitable for viewing by the audience. The modification 270 results in a doubling of the coefficient value for every 6 steps in the quantization parameter, and thus may substantially increase the size of the memory requirements. The increased value results in one or more zeros being included as the least significant bits.

Figure 3A:
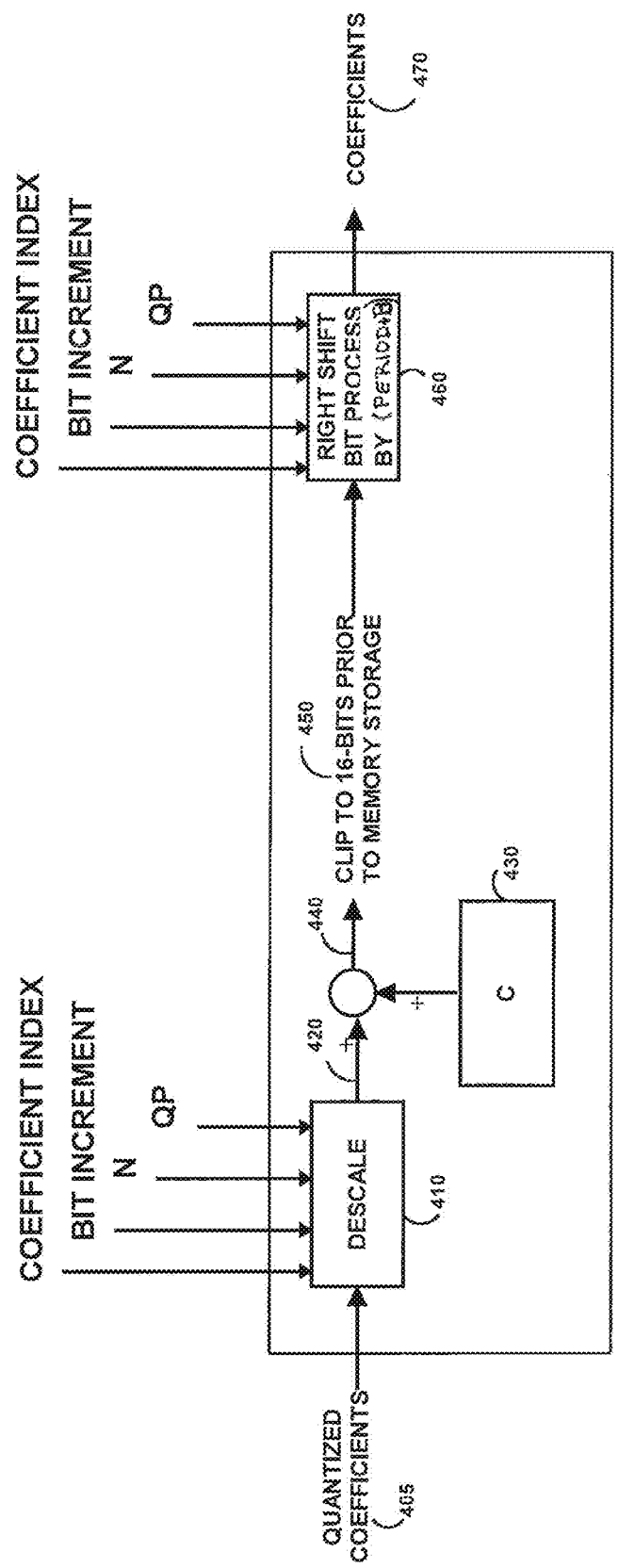
FIG. 3A and FIG. 3B illustrates a modified dequantizer.

Referring to FIG. 3A, with this understanding of the operation of the dequantizer 210 (see FIG. 2, prior art) an improved dequantizer 400 (see FIGS. 3A and 3B, not prior art) receives the quantized coefficients 405 and descales 410 the quantized coefficients, preferably based upon a function of a remainder, transform size, and/or a coefficient index (e.g., position), to determine an intermediate set of values 420. An optional adjustment mechanism C 430 may be applied, which is preferably a variable dependent on transform size (N) or a function of a received quantization parameter (QP), to determine resulting data 440. The resulting data 440 from the quantized coefficients 405 may include rogue data or otherwise is not compliant with a standard, and accordingly the modified dequantizer 400 should impose a fixed limit on the resulting data 440. The resulting data 440 is preferably clipped 450 to a predetermined bit depth, and thus an N×N block of data is stored in memory within the dequantizer 400. For example the clipping 450 for a predetermined bit depth of 16 bits results in any values over 32,767 being set to the maximum value, namely, 32,767. Likewise for a predetermined bit depth of 16 bits results in any values less than −32,768 being set to the minimum value, namely, −32,768. Other bit depths and clipping values may likewise be used. In this manner, the maximum memory bandwidth required is limited by the system, in a manner independent of the input quantized coefficients. This reduces the computational complexity of the system and reduces the memory requirements, which is especially suitable for embedded systems.

Figure 3B:
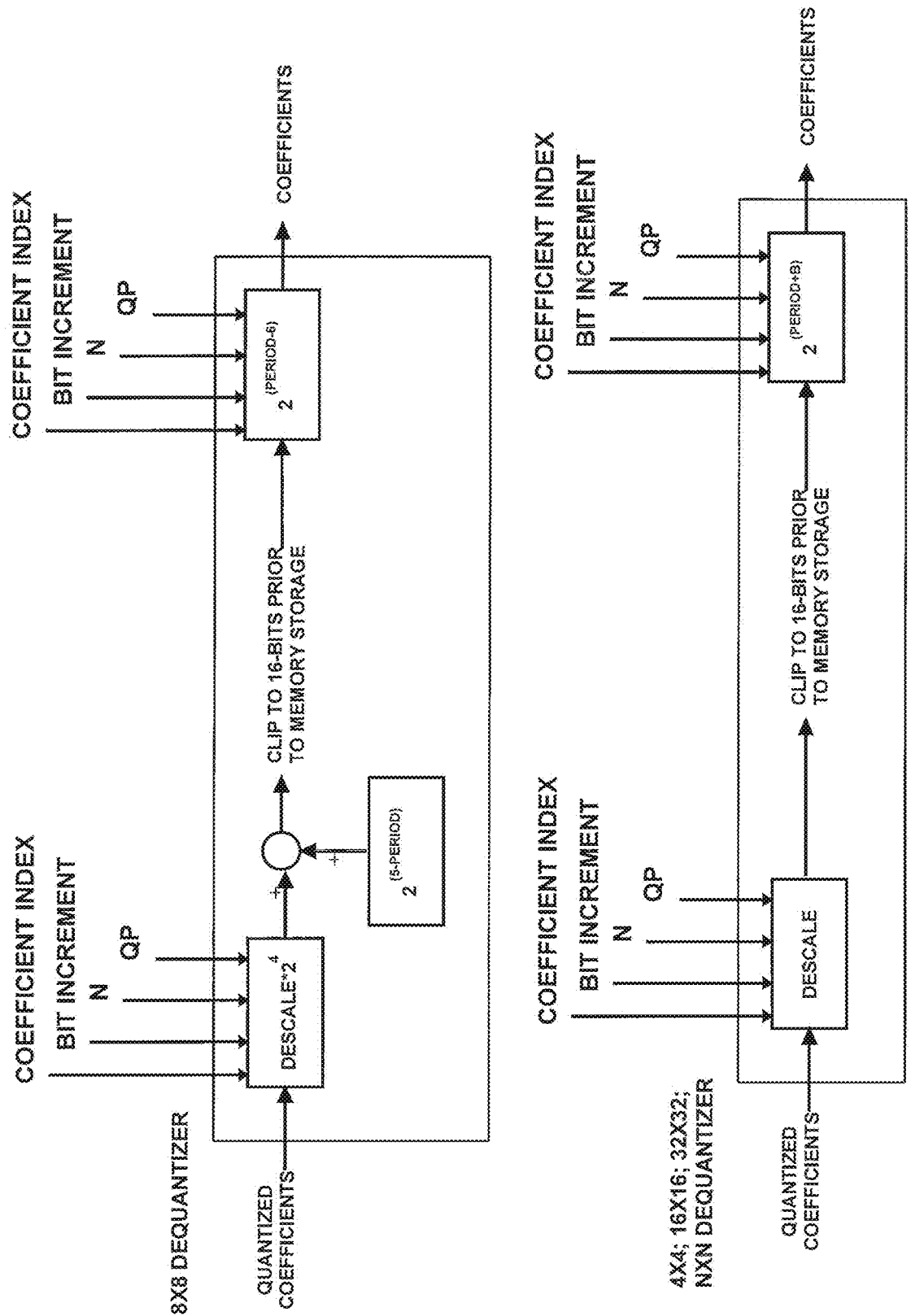

After imposing the clipping 450, the data with the maximum predetermined bit depth is modified by a factor of $2^{(Period+B)}$ 460. The results of the modification 460 are provided as coefficients 470. The result of performing the $2^{(Period+B)}$ 460 after the clipping 450 reduces the rate distortion loss. Preferably, the adjustment mechanism C 430 used for 8×8 transform coefficients is $2^{(5-Period)}$ and the $2^{(Period+B)}$ 460 is $2^{(Period-6)}$. The process 460 may be based upon, if desired, a function of the transform size (N) or a function of a received quantization parameter (QP). Also, the adjustment mechanism C 430 used for other sized transform coefficients (such as 4×4, 16×16, and 32×32) is preferably zero, and the valued of $2^{(Period+B)}$ 460 is $2^{(Period)}$. Also, B may be a function of N and C may be a function of N. Referring to FIG. 3B, a particular implementation of FIG. 3A is illustrated.

Figure 4:
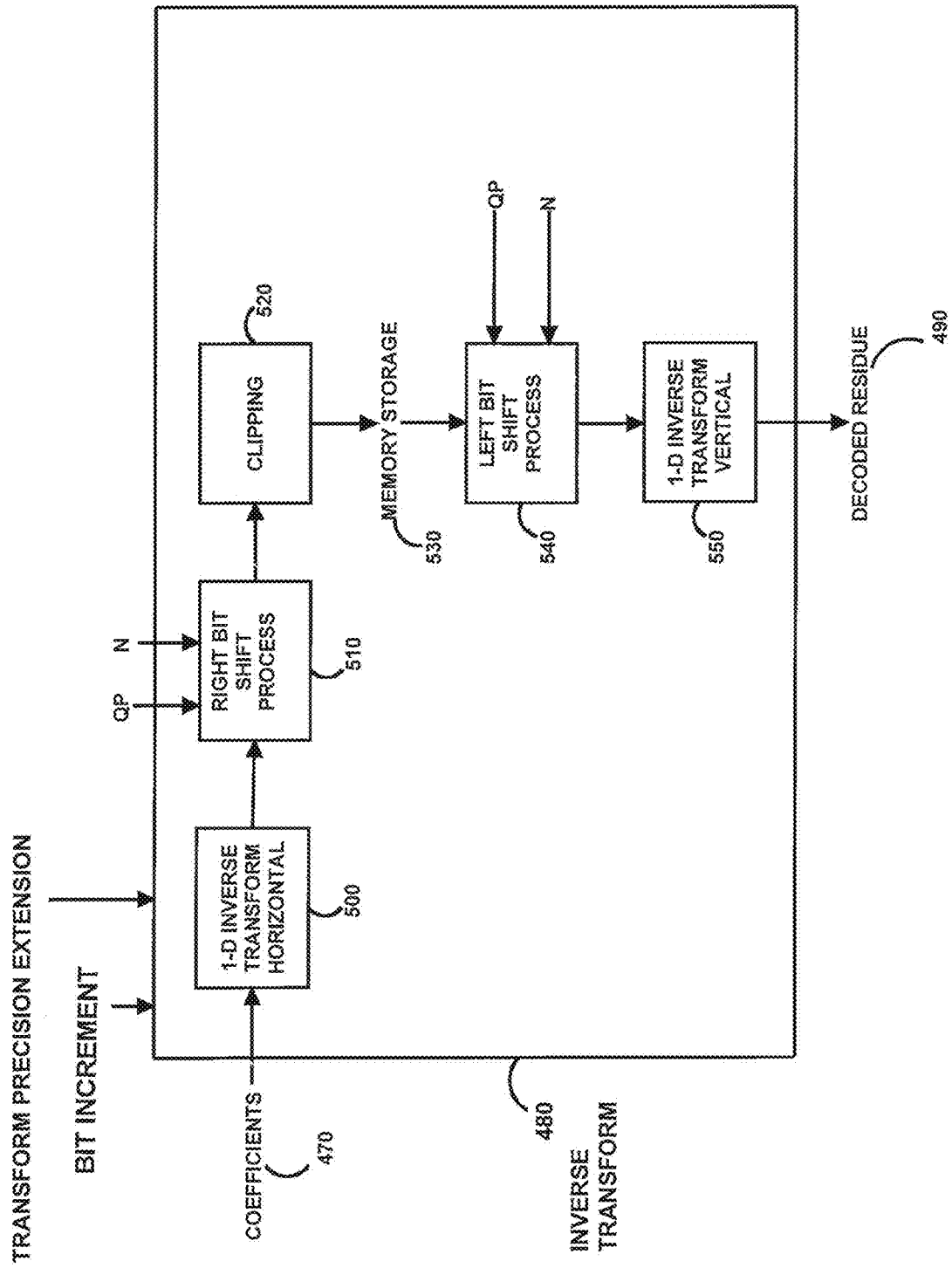
FIG. 4 illustrates a modified inverse transform.

Referring to FIG. 4, the coefficients 470 from the dequantizer 400 (see FIGS. 3A and 3B) are provided to an inverse transform 480 designed to provide a decoded residue 490 that has an acceptable rate distortion loss. The coefficients 470 are preferably transformed by a 1-dimensional inverse horizontal (or vertical) transform 500. Based upon a desirable number of output bits to maintain an acceptable rate distortion loss, the output of the transform 500 may be modified by a right bit shift process 510 for a desirable number of bits. In this manner, a selected number of the least significant bits are discarded in order to reduce the memory requirements of the system. For example, if 19 bits are likely to result from the inverse transform 500 and it is desirable to have a 16 bit outcome, then the right bit shift process 510 removes the 3 least significant bits. The resulting shifted bits are clipped 520 to a predetermined threshold. An example of a predetermined threshold may be 16-bits. The clipping 520 further enforces a memory bandwidth limitation, the results of which are stored in memory 530. The data stored in memory 530 is substantially reduced as a result of the shifting 510 removing the least significant bit(s). The data stored in the memory 530 is then shifted left by a left bit shift process 540, preferably by the same number of bits as the right bit shift process 510. The shifting results in zeros in the least significant bit(s). The shifted data is then preferably transformed by a 1-dimensional inverse vertical (or horizontal) transform 550, resulting in the decoded residue 490.

The rate distortion loss is dependent on the number of bits used in the processing and the data block size. Preferably, the right bit shift process 510 and the left bit shift process 540 are dependent on the size N of the block (number of horizontal pixels×number of vertical pixels for a square block of pixels). For example, for a 4×4 block the shift may be 3, for an 8×8 block the shift may be 2, for a 16×16 block the shift may be 8, and for a 32×32 block the shift may be 9. Alternatively, the right bit shift process 510 and the left bit shift process 540 may be determined based upon a parameter, such as a quantization parameter (QP), passed in the bit stream, internal bit-depth increment (IBDI), the transform precision extension (TPE) parameters, or otherwise selectable by the decoder.

Figure 5:
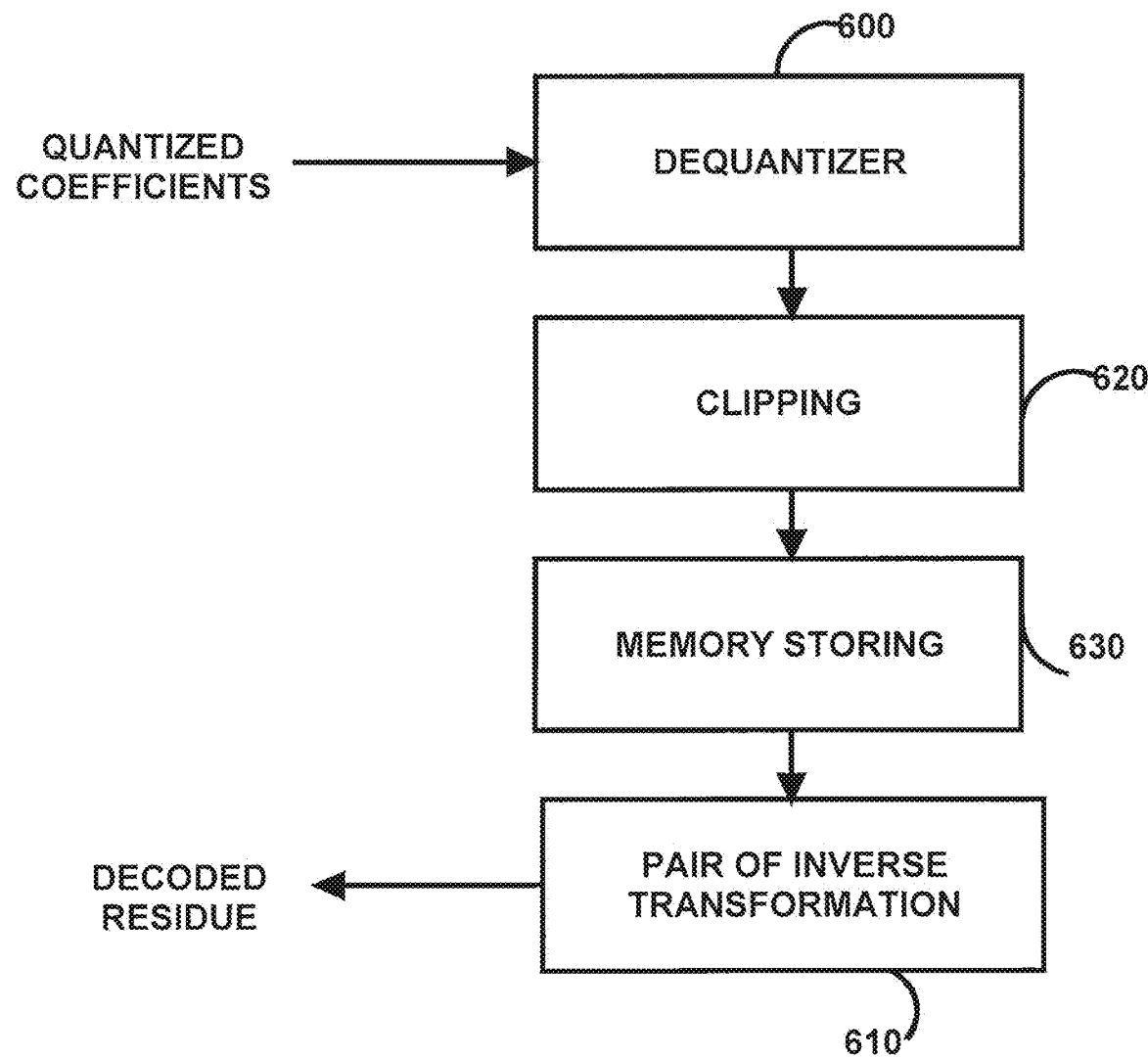
FIG. 5 illustrates another decoder.

Referring to FIG. 5, in another embodiment the decoder receives the quantized coefficients which are processed by any suitable dequantizer 600 and any suitable inverse transform 610. It is desirable to include an express memory bandwidth limitation which is preferably implemented by including a clipping function 620. After the clipping function 620, the data may be stored in memory 630, which is thereafter used for the inverse transform 610.

Figure 6:
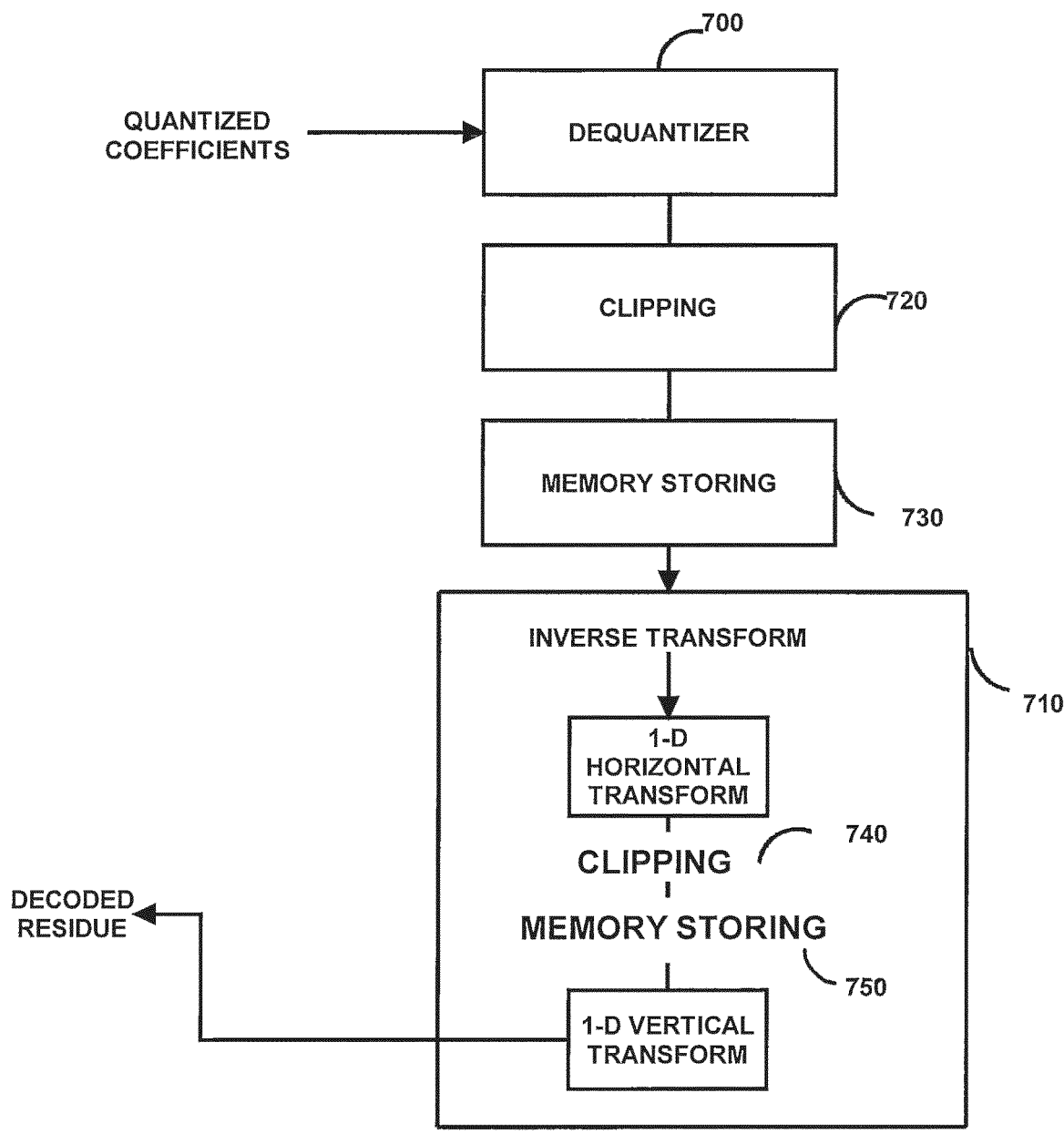
FIG. 6 illustrates yet another decoder.

Referring to FIG. 6, in another embodiment the decoder receives the quantized coefficients which are processed by any suitable dequantizer 700 and any suitable inverse transform 710. For example, the inverse transform may be the one illustrated in FIG. 4. It is desirable to include an express memory bandwidth limitation to reduce the computation complexity which is preferably implemented by including a clipping function 720. After the clipping function 720, the data may be stored in memory 730, which is thereafter used for the inverse transform 710. It is further desirable to include an explicit memory bandwidth limitation which is preferably implemented by including a clipping function 740 between a pair of 1-dimensional transforms. The 1-dimensional transforms may be performed in any order or manner. After the clipping function 740, the data may be stored in memory 750.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A video encoding method comprising:
   dividing video data into one or more blocks of video, each block of video representing a plurality of pixels;
   encoding the one or more blocks of video, the encoding comprises generating a set of quantized coefficients for each block of video; and
   transmitting sets of quantized coefficients corresponding to the one or more blocks of video in a bitstream to a decoder,
   wherein the decoder is configured to decode the video data by performing operations comprising:
      descaling the quantized coefficients by multiplying the quantized coefficients with numbers dependent on a coefficient index and a transform size of the block to generate descaled coefficients;
      applying an adjustment to the descaled coefficients to generate adjusted descaled coefficients, wherein the adjustment is a variable based on the transform size;
      clipping the adjusted descaled coefficients to a predetermined bit depth to generate clipped coefficients; and
      inverse transforming the clipped coefficients to output a decoded residue.

2. The method of claim 1, wherein inverse transforming the clipped coefficients to output a decoded residue comprises:
   one-dimensional inverse transforming the clipped coefficients in a first direction to generate first direction inverse transformed coefficients;
   shifting the first direction inverse transformed coefficients to generate shifted coefficients;
   clipping the shifted coefficients to the predetermined bit depth to generate second clipped coefficients; and
   one-dimensional inverse transforming the second clipped coefficients in a second direction to determine the decoded residue.

3. The method of claim 2, wherein shifting the first direction inverse transformed coefficients comprises:
   selecting, from among multiple different quantities of bits by which to shift coefficients and based on a size of a block of video, a particular quantity of bits by which to shift the first direction inverse transformed coefficients; and
   shifting the first direction inverse transformed coefficients by the particular quantity of bits.

4. The method of claim 2, wherein the first direction is a horizontal direction.

5. The method of claim 2, wherein the first direction is a vertical direction.

6. The method of claim 2, wherein the second direction is orthogonal to the first direction.

7. The method of claim 2, wherein shifting the first direction inverse transformed coefficients to generate first shifted inverse transformed coefficients comprises:
   selecting, from among multiple different quantities of bits by which to shift coefficients, a particular quantity of bits by which to shift coefficients; and
   shifting the first direction inverse transformed coefficients by the particular quantity of bits to generate first shifted inverse transformed coefficients.

8. The method of claim 7, wherein selecting the particular quantity of bits by which to shift coefficients comprises:
   determining that a block of video is of a particular size; and
   selecting, from among multiple different quantities of bits by which to shift coefficients that each correspond to different sizes of blocks of video, a particular quantity of bits by which to shift coefficients that corresponds to the particular size of the block of video.

9. The method of claim 2, wherein shifting the first direction inverse transformed coefficients comprises shifting the first direction inverse transformed coefficients by an amount that is based on a transform precision extension parameter.

10. The method of claim 2, wherein shifting the first direction inverse transformed coefficients is performed after the one-dimensional inverse transforming in the first direction and prior to the one-dimensional inverse transforming in the second direction.

11. The method of claim 1, wherein generating the set of quantized coefficients for each block of video comprises applying discrete cosine transform (DCT) to each block of video.

12. The method of claim 1, wherein the applying the adjustment is performed after the descaling.

* * * * *